P. THOMSEN.
Assignor of one-third his right to N. Thomsen.
WAGON-BRAKE LEVERS.
No. 7,880. Reissued Sept. 11, 1877.
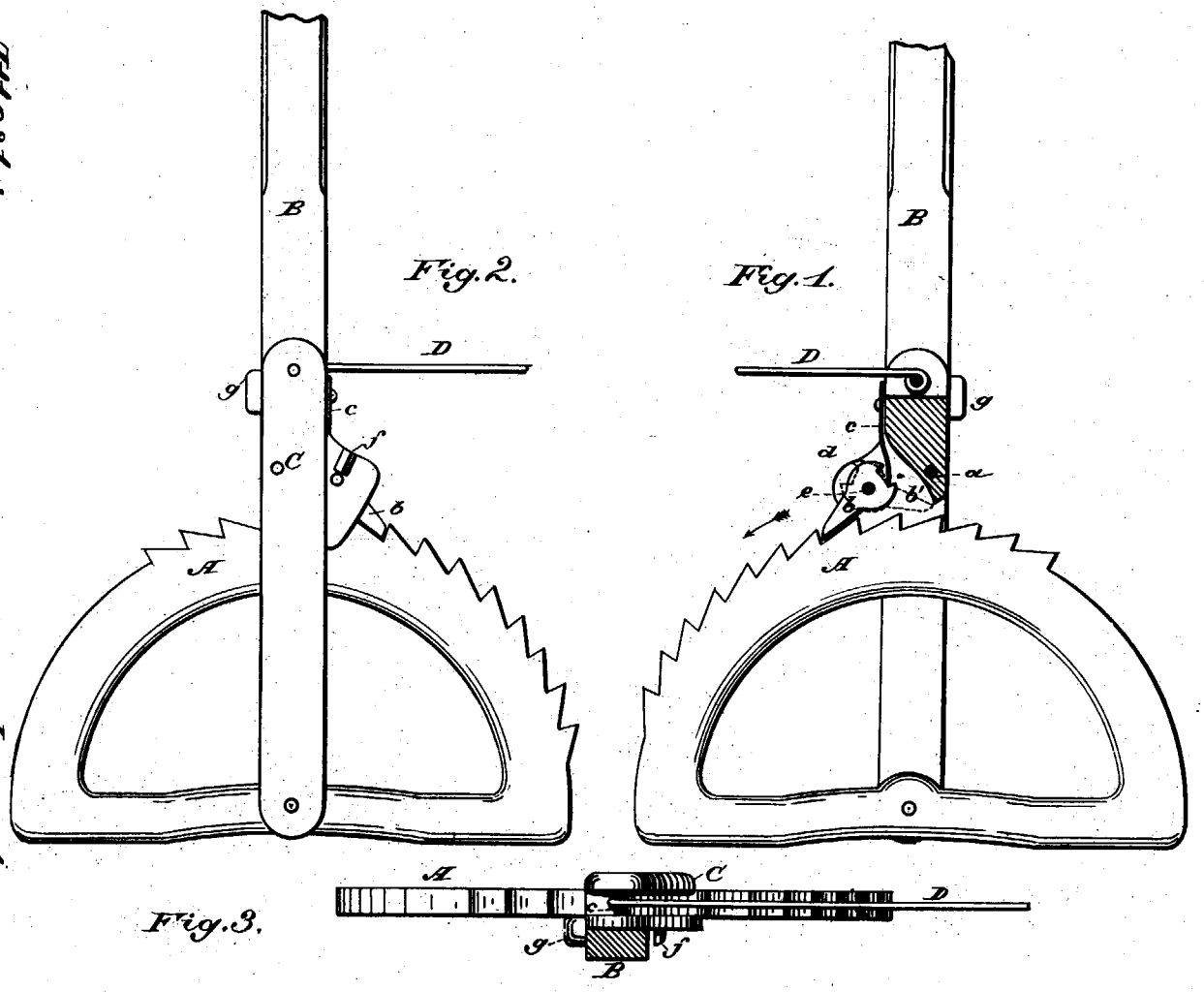
Attest:
E. E. Capel.
August Herwhn.
Inventor:
Poul Thomsen,
by C. A. Snow & Co.
Attys.
N. PETERS, PHOTO-LITHOGRAPHER, WASHINGTON, D. C.

UNITED STATES PATENT OFFICE.

POUL THOMSEN, OF ATCHISON, KANSAS, ASSIGNOR OF ONE-THIRD HIS RIGHT TO NIELS THOMSEN, OF NEENAH, WISCONSIN.

IMPROVEMENT IN WAGON-BRAKE LEVERS.

Specification forming part of Letters Patent No. 192,032, dated June 12, 1877; Reissue No. 7,880, dated September 11, 1877; application filed July 30, 1877.

*To all whom it may concern:*

Be it known that I, POUL THOMSEN, of Atchison, in the county of Atchison and State of Kansas, have invented certain new and useful Improvements in Wagon-Brake Levers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to braking devices for sleighs, sleds, or vehicles of any kind on which brakes are used; and it consists in the construction of the pawl-and-ratchet attachment for retaining the brake in position in such a manner that when pushing back on the brake-lever it will fly clear back to the end of the ratchet without the pawl catching in any of its notches, thereby only partially disengaging the brake.

In the drawing, Figure 1 is a side elevation, the plate which covers the pawl-box having been removed. Fig. 2 is a view of the side opposite to that represented in the preceding figure, and Fig. 3 is a top plan.

Similar letters of reference indicate corresponding parts in all the figures.

A is a segmental ratchet, and B is the brake-lever. C is the pawl-box, which is pivoted at *a* upon the side of the lever B, so as to swing easily in both directions, and contains a pawl, *b*, and a spring, *c*. The latter may be secured upon a block or piece, *d*, in the back of pawl-box C, its end projecting into the segmental notch *b'* in pawl *b*, as shown, so as to work against either of the two shoulders *e* or *e'* of pawl *b*. D is a rod or chain, which is secured in any suitable manner to the end of the swinging pawl-box C, and passes to the brake. (Not shown in the drawing.) Secured upon the back plate of box C are two lugs, *f* and *g*, one of which, *f*, prevents, by abutting against lever B, the pawl-box from tilting too far forward, while the other, *g*, by abutting against the other side of the lever, prevents box C from tilting too far on the opposite side. Between these two lugs the box has free play to oscillate. When the lever B is grasped by the hand of the driver, box C will be in position flush with the lever—that is, lug *g* lying close up against the lever, as represented in Fig. 2 of drawing.

By this construction and arrangement of parts pawl *b* will present a rigid resistance against the notches in ratchet A, thereby preventing the lever from swinging back of its own accord, and keeping the brakes on after the driver, having applied the brakes, removes his hand from the lever; but when, to let off the brakes, he pushes back on lever B in the direction of the arrow, the pivoted box C will permit pawl *b* to tip over or turn back, as indicated by the dotted lines in Fig. 1, so as to allow it to ride over the notches, and permit lever B to swing clear back. The segmental notch *b'* in pawl *b* allows the latter play enough for this purpose.

It is obvious that the shape of the pawl, and also the arrangement of the spring, may be varied or modified without changing the spirit of my invention, which consists, broadly, in the combination of the lever B, swinging pawl and pawl-box C, and ratchet A.

Having thus described my invention, I claim and desire to secure by Letters Patent of the United States—

The combination of the segmental ratchet A, brake-lever B, swinging pawl-box C, and pawl *b*, all combined to operate substantially as and for the purpose herein shown and specified.

In testimony that I claim the foregoing I have hereunto set my hand this 13th day of July, 1877.

POUL THOMSEN.

Witnesses:
B. P. WAGGENER,
H. P. STEBBINS.